US011655742B2

(12) United States Patent
Sugimoto (10) Patent No.: US 11,655,742 B2
(45) Date of Patent: May 23, 2023

(54) VEHICLE CONTROL DEVICE

(71) Applicant: TOYOTA JIDOSHA KABUSHIKI KAISHA, Toyota (JP)

(72) Inventor: Hitoki Sugimoto, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 17/809,110

(22) Filed: Jun. 27, 2022

(65) Prior Publication Data
US 2023/0076483 A1  Mar. 9, 2023

(30) Foreign Application Priority Data

Sep. 3, 2021 (JP) .............................. JP2021-144024

(51) Int. Cl.
*F01N 3/02* (2006.01)
*G07C 5/08* (2006.01)
(Continued)

(52) U.S. Cl.
CPC ................ *F01N 3/023* (2013.01); *F01P 3/18* (2013.01); *F01P 5/04* (2013.01); *G07C 5/0808* (2013.01);
(Continued)

(58) Field of Classification Search
CPC .......... F01N 3/023; F01N 3/035; F01N 3/021; F01N 3/0233; F01N 3/08; F01N 3/0234; F01N 3/0821; F01N 3/0807; F01N 3/0238; F01N 9/002; F01N 2900/1606; F01N 2900/1602; F01N 2900/08;
(Continued)

(56) References Cited

U.S. PATENT DOCUMENTS

| | | | |
|---|---|---|---|
| 9,915,056 B2* | 3/2018 | Tanaka | F15B 1/00 |
| 10,865,692 B2* | 12/2020 | Kinugawa | F04D 27/004 |
| 2013/0269320 A1* | 10/2013 | Kwak | F01N 3/0253 |
| | | | 60/311 |

FOREIGN PATENT DOCUMENTS

| | | |
|---|---|---|
| EP | 1 801 370 A1 | 6/2007 |
| JP | 8-232658 A | 9/1996 |

(Continued)

*Primary Examiner* — Audrey B. Walter
*Assistant Examiner* — Dapinder Singh
(74) *Attorney, Agent, or Firm* — Oblon, McClelland, Maier & Neustadt, L.L.P.

(57) ABSTRACT

A vehicle includes an internal combustion engine. The internal combustion engine includes an exhaust passage, and a filter for collecting particulate matter contained in the exhaust gas. The vehicle includes a cooling fan for circulating air around a radiator and the filter. A control device of the vehicle executes an accumulated amount calculation process for calculating a particulate matter accumulated amount. The control device executes a regeneration process under a condition that the particulate matter accumulated amount exceeds a specified amount. The regeneration process is a process for regenerating the filter when the particulate matter collected on the filter is combusted. The control device executes a fan drive process for driving the cooling fan. When the regeneration process is being executed, the control device executes the fan drive process regardless of a coolant temperature under a condition that a vehicle speed is smaller than a specified speed.

4 Claims, 4 Drawing Sheets

(51) Int. Cl.
  *F01P 5/04* (2006.01)
  *F01P 3/18* (2006.01)
  *F01N 3/023* (2006.01)

(52) U.S. Cl.
  CPC ..... *F01P 2005/046* (2013.01); *F01P 2025/08* (2013.01); *F01P 2025/66* (2013.01)

(58) Field of Classification Search
  CPC ......... F01N 2900/1404; F01N 2550/04; F01N 2560/06; F01N 11/00; F01P 3/18; F01P 5/04; F01P 2005/046; F01P 2025/08; F01P 2025/66; G07C 5/0808; Y02T 10/12; Y02T 10/40
  See application file for complete search history.

(56) References Cited

FOREIGN PATENT DOCUMENTS

| | | |
|---|---|---|
| JP | 2006-83817 A | 3/2006 |
| JP | 2008-308996 A | 12/2008 |

\* cited by examiner

VEHICLE CONTROL DEVICE

CROSS-REFERENCE TO RELATED APPLICATION

This application claims priority to Japanese Patent Application No. 2021-144024 filed on Sep. 3, 2021, incorporated herein by reference in its entirety.

BACKGROUND

1. Technical Field

The present disclosure relates to a vehicle control device.

2. Description of Related Art

A vehicle described in Japanese Unexamined Patent Application Publication No. 2006-083817 (JP 2006-083817 A) is equipped with an internal combustion engine. The internal combustion engine includes an exhaust passage through which exhaust gas circulates, and a filter for collecting particulate matter contained in the exhaust gas circulating through the exhaust passage. Further, a vehicle control device described in JP 2006-083817 A executes a regeneration process for regenerating the filter by combusting the particulate matter collected on the filter.

A vehicle described in Japanese Unexamined Patent Application Publication No. 8-232658 (JP 8-232658 A) includes a radiator for cooling coolant of an internal combustion engine and a cooling fan for circulating air around the radiator. A vehicle control device described in JP 8-232658 A drives the cooling fan when the temperature of the coolant is equal to or higher than a predetermined temperature.

SUMMARY

In the vehicle as described in JP 2006-083817 A, the temperature of the filter rises when a filter regeneration process is executed. At this time, in order to suppress an excessive rise in the temperature of the filter, it is preferable that the air around the filter circulate without staying. However, in the control of the cooling fan described in JP 8-232658 A, when the temperature of the coolant is lower than the predetermined temperature, the cooling fan may be stopped. Therefore, when a control technique of the cooling fan described in JP 8-232658 A is just applied to the vehicle described in JP 2006-083817 A, the air around the filter does not circulate during the filter regeneration process, and the filter may be overheated.

In order to solve the above issue, the present disclosure provides a vehicle control device that controls a vehicle including an internal combustion engine including an exhaust passage through which exhaust gas circulates and a filter for collecting particulate matter contained in the exhaust gas, a radiator for cooling coolant of the internal combustion engine, and a cooling fan for circulating air around the radiator and around the filter. The vehicle control device executes an accumulated amount calculation process for calculating a particulate matter accumulated amount that is an accumulated amount of the particulate matter collected on the filter, a regeneration process that is executed under a condition that the particulate matter accumulated amount exceeds a predetermined specified amount and that regenerates the filter when the particulate matter collected on the filter is combusted, and a fan drive process for driving the cooling fan when a coolant temperature that is a temperature of the coolant is higher than a predetermined specified coolant temperature. When the regeneration process is executed, the vehicle control device executes the fan drive process regardless of the coolant temperature under a condition that a vehicle speed that is a speed of the vehicle is at least smaller than a predetermined specified speed.

According to the above configuration, in a situation where the regeneration process that causes the temperature of the filter to rise is executed, and the air around the filter is less likely to be circulated by traveling wind, the fan drive process is executed even when it is not necessary to cool the coolant. Therefore, the air around the filter circulates, so that it is possible to suppress overheating of the filter.

In the vehicle control device, the regeneration process includes a forced regeneration process executed under a condition that the particulate matter accumulated amount exceeds a predetermined upper limit amount as a value larger than the specified amount, the vehicle speed is smaller than the specified speed, and a request signal from an outside of the vehicle is received, and when the forced regeneration process is executed, the fan drive process may be executed regardless of the coolant temperature and a temperature of the filter.

According to the above configuration, when the forced regeneration process is executed, the fan drive process is executed regardless of the temperature of the filter. Therefore, cooling of the filter can be started before the temperature of the filter becomes excessively high. As described above, cooling of the filter is started in a state where the temperature of the filter is not excessively high, so that it is possible to suppress overheating of the filter. As a result, it is possible to suppress heat from excessively staying around the filter. Further, even if the temperature of the filter becomes high, it is possible to suppress the temperature of the filter from reaching a temperature that adversely affects the function of the filter, so that it is possible to quickly suppress the heat from excessively staying around the filter.

In the vehicle control device, the regeneration process further includes a spontaneous regeneration process that is spontaneously executed by the vehicle without relying on the request signal from the outside of the vehicle, and when the spontaneous regeneration process is executed, the fan drive process may be executed regardless of the coolant temperature under a condition that the vehicle speed is smaller than the specified speed and the temperature of the filter exceeds a predetermined specified temperature.

In the above configuration, the particulate matter accumulated amount when the spontaneous regeneration process is executed is likely to be smaller than the particulate matter accumulated amount when the forced regeneration process is executed. Reflecting this difference in the particulate matter accumulated amounts, a calorific value in the filter when the spontaneous regeneration process is executed is smaller than that when the forced regeneration process is executed. As long as the spontaneous regeneration process in which the calorific value in the filter is small as described above, the filter is quickly cooled even when the cooling fan is driven only when the temperature of the filter exceeds the specified temperature. When driving of the cooling fan is limited, energy consumption associated with driving of the cooling fan can be also suppressed.

In the vehicle control device, the cooling fan includes a fan main body and a motor for driving the fan main body, a motor failure determination process for determining presence or absence of a failure in the motor is executed, and when determination is made in the motor failure determination process that the failure occurs in the motor, the fan drive process and the forced regeneration process may be prohibited.

According to the above configuration, the fan drive process is executed after the motor failure determination process determines that the failure does not occur in the motor. Therefore, even if the request signal is input from the outside of the vehicle, and the forced regeneration process is executed, the CPU does not execute the fan drive process when determination is made that the failure occurs in the motor. Therefore, in such a case, it is possible to suppress an excessive load from being applied to the motor of the cooling fan.

In the vehicle control device, the forced regeneration process may be executed after the fan drive process is started. According to the above configuration, the fan drive process is executed before the forced regeneration process is executed. Therefore, the cooling fan is driven before the temperature of the filter rises, so that cooling of the periphery of the filter can be started. Therefore, even when the temperature of the filter rises, the air is blown to the periphery of the filter, so that the heat of the filter is likely to be sequentially removed from the periphery of the filter. As a result, it is possible to suppress the heat from staying around the filter.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of a vehicle control device will be described with reference to the drawings.

Overall Configuration of Vehicle

First, the overall configuration of a vehicle to which the vehicle control device is applied will be described.

Figure 1:
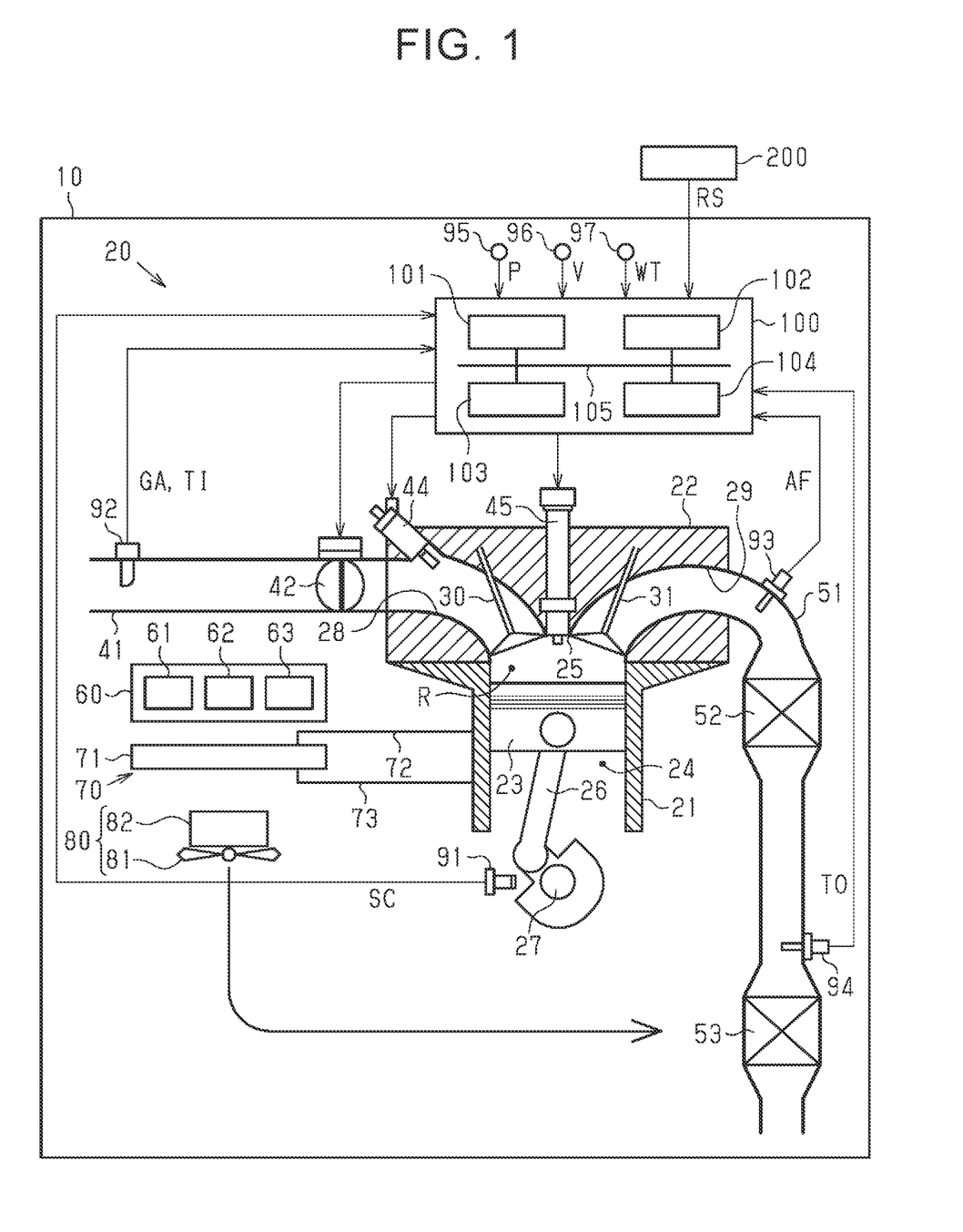
FIG. 1 is a diagram showing a schematic configuration of a vehicle.

As shown in FIG. 1, a vehicle 10 includes an internal combustion engine 20. The internal combustion engine 20 includes cylinder block 21, a cylinder head 22, a piston 23, and a cylinder 24. The cylinder 24 is a columnar space partitioned inside the cylinder block 21. Both ends of the cylinder 24 in a direction along the central axis thereof are open to the outside of the cylinder block 21. The piston 23 is disposed in the cylinder 24. The top surface of the piston 23 faces a first end in the direction along the central axis of the cylinder 24. The cylinder head 22 is connected to the cylinder block 21. The outer surface of the cylinder head 22 includes a recess 25. The recess 25 faces the cylinder 24 in the direction along the central axis of the cylinder 24. A combustion chamber R is partitioned by the wall surface of the cylinder block 21 that partitions the cylinder 24, the wall surface of the recess 25, and the top surface of the piston 23.

The internal combustion engine 20 includes a connecting rod 26 and a crank shaft 27. The connecting rod 26 is connected to the piston 23. The connecting rod 26 extends in a direction opposite to the cylinder head 22 with the piston 23 interposed therebetween. The crank shaft 27 is connected to the connecting rod 26. The connecting rod 26 and the crank shaft 27 convert a reciprocating linear motion of the piston 23 into a rotary motion.

The cylinder head 22 includes an intake port 28. The intake port 28 is a space partitioned inside the cylinder head 22. A first end of the intake port 28 is open toward the recess 25. A second end of the intake port 28 is open to the outside of the cylinder head 22.

The cylinder head 22 includes an exhaust port 29. The exhaust port 29 is a space partitioned inside the cylinder head 22. A first end of the exhaust port 29 is open toward the recess 25. A second end of the exhaust port 29 is open to the outside of the cylinder head 22.

The internal combustion engine 20 includes an intake valve 30 and an exhaust valve 31. The intake valve 30 is a valve that opens and closes the first end of the intake port 28. The exhaust valve 31 is a valve that opens and closes the first end of the exhaust port 29.

Although FIG. 1 shows only one set of the combustion chamber R and the configuration related to the combustion chamber R, the internal combustion engine 20 includes multiple sets of these configurations.

The internal combustion engine 20 includes an intake passage 41 for taking in outside air. The intake passage 41 is connected to the second end of the intake port 28. The intake passage 41 accommodates a throttle valve 42. The throttle valve 42 adjusts an intake air amount GA that is a flow rate of air flowing through the intake passage 41 when a valve opening degree is changed. The air taken in from the intake passage 41 flows into the combustion chamber R through the intake port 28.

The internal combustion engine 20 includes a port injection valve 44. The port injection valve 44 is attached to the cylinder head 22. Therefore, the port injection valve 44 is located on the downstream side with respect to the throttle valve 42 of the intake passage 41. The port injection valve 44 injects fuel into the intake port 28.

The internal combustion engine 20 includes a spark plug 45. The spark plug 45 is attached to the cylinder head 22. The spark plug 45 is located between the intake port 28 and the exhaust port 29. The spark plug 45 ignites air-fuel mixture introduced into the combustion chamber R by a spark.

The internal combustion engine 20 includes an exhaust passage 51 through which exhaust gas generated by combustion in the combustion chamber R circulates. The exhaust passage 51 is connected to the second end of the exhaust port 29.

The internal combustion engine 20 includes a three-way catalyst 52. The three-way catalyst 52 is located in the middle of the exhaust passage 51. The three-way catalyst 52 reduces hydrocarbons, carbon monoxide and nitrogen oxides contained in the exhaust gas. Further, the three-way catalyst 52 has an oxygen storage capacity.

The internal combustion engine 20 includes a filter 53. The filter 53 is located on the downstream side when viewed from the three-way catalyst 52 located in the exhaust passage 51. The filter 53 collects particulate matter contained in the exhaust gas.

The vehicle 10 includes a cooling device 60. The cooling device 60 is a device for adjusting a temperature of air in a vehicle cabin by using a refrigerant. The refrigerant is, for example, carbon dioxide, chlorofluorocarbon, or the like. The cooling device 60 includes a condenser 61, an evaporator 62, and a compressor 63. The condenser 61 cools and liquefies the refrigerant. The evaporator 62 vaporizes the refrigerant liquefied by the condenser 61 to cool the air. The compressor 63 adiabatically compresses the refrigerant vaporized by the evaporator 62 and supplies this to the condenser 61. Then, the air cooled by the evaporator 62 is blown as cooling air from an air outlet in the vehicle cabin.

The vehicle 10 includes a cooling system 70 for the internal combustion engine 20. The cooling system 70 includes a radiator 71, an introduction passage 72, and a lead-out passage 73. Although not shown, by a water pump included in the cooling system 70, the coolant that has passed through the radiator 71 flows through the introduction passage 72 to a water jacket of the internal combustion engine 20. The coolant that has passed through the water jacket of the internal combustion engine 20 returns to the radiator 71 through the lead-out passage 73.

A heat exchange between the coolant passing through the radiator 71 and the air is promoted. Thereby, the coolant passes through the radiator 71, so that the heat of the coolant is released. As a result, the temperature of the coolant passing through the radiator 71 decreases.

The vehicle 10 includes a cooling fan 80. The cooling fan 80 is a fan for circulating the air around the condenser 61 and the radiator 71. The cooling fan 80 includes a fan main body 81 and a motor 82 for driving the fan main body 81. The fan main body 81 rotates to blow the air in a certain direction. The motor 82 is driven by receiving electric power supplied from a battery (not shown).

The cooling fan 80 is located in the same engine compartment as the filter 53. Therefore, when the cooling fan 80 is driven, an air flow is generated in the engine compartment. Then, part of the air blown from the cooling fan 80 reaches the filter 53, and the air around the filter 53 is agitated. That is, the cooling fan 80 also serves as a fan for circulating the air around the filter 53.

The vehicle 10 includes a crank angle sensor 91. The crank angle sensor 91 is located in the vicinity of the crank shaft 27. The crank angle sensor 91 detects a rotation phase SC of the crank shaft 27.

The vehicle 10 includes an air flow meter 92. The air flow meter 92 is located on the upstream side when viewed from the throttle valve 42 located in the intake passage 41. The air flow meter 92 detects the intake air amount GA that is a flow rate of the air circulating through the intake passage 41. Further, the air flow meter 92 detects an intake air temperature TI that is a temperature of the air taken in by the internal combustion engine 20.

The vehicle 10 includes an air-fuel ratio sensor 93. The air-fuel ratio sensor 93 is located on the upstream side when viewed from the three-way catalyst 52 located in the exhaust passage 51. The air-fuel ratio sensor 93 detects oxygen concentration of the exhaust gas flowing through the exhaust passage 51, that is, an air-fuel ratio AF of the air-fuel mixture.

The vehicle 10 includes an exhaust gas temperature sensor 94. The exhaust gas temperature sensor 94 is located between the three-way catalyst 52 and the filter 53 in the exhaust passage 51. The exhaust gas temperature sensor 94 detects an exhaust gas temperature TO that is a temperature of the exhaust gas discharged from the three-way catalyst 52.

The vehicle 10 includes a refrigerant pressure sensor 95. The refrigerant pressure sensor 95 detects a refrigerant pressure P of the refrigerant flowing between the condenser 61 and the evaporator 62 of the cooling device 60.

The vehicle 10 includes a vehicle speed sensor 96. The vehicle speed sensor 96 detects a vehicle speed V that is a travel speed of the vehicle 10.

The vehicle 10 includes a coolant temperature sensor 97. The coolant temperature sensor 97 is attached in the vicinity of the radiator 71 in the lead-out passage 73. The coolant temperature sensor 97 detects a coolant temperature WT that is a temperature of the coolant that cools the internal combustion engine 20.

The vehicle 10 includes a control device 100. The control device 100 controls the vehicle 10. The control device 100 acquires a signal indicating the rotation phase SC of the crank shaft 27 from the crank angle sensor 91. The control device 100 acquires a signal indicating the intake air amount GA and a signal indicating the intake air temperature TI from the air flow meter 92. The control device 100 acquires a signal indicating the air-fuel ratio AF from the air-fuel ratio sensor 93. The control device 100 acquires a signal indicating the exhaust gas temperature TO that is a temperature of the exhaust gas discharged from the three-way catalyst 52, from the exhaust gas temperature sensor 94.

The control device 100 acquires a signal indicating the refrigerant pressure P from the refrigerant pressure sensor 95. The control device 100 acquires a signal indicating the vehicle speed V from the vehicle speed sensor 96. The control device 100 acquires a signal indicating the coolant temperature WT from the coolant temperature sensor 97.

The control device 100 includes a central processing unit (CPU) 101, a peripheral circuit 102, a read-only memory (ROM) 103, a storage device 104, and a bus 105. The bus 105 connects the CPU 101, the peripheral circuit 102, the ROM 103, and the storage device 104 such that the CPU 101, the peripheral circuit 102, the ROM 103, and the storage device 104 can communicate with each other. The peripheral circuit 102 includes a circuit that generates a clock signal defining an internal operation, a power supply circuit, a reset circuit, and the like. The ROM 103 stores in advance various programs for the CPU 101 to execute various types of control. The CPU 101 especially controls the internal combustion engine 20 and the cooling fan 80 with the vehicle 10 as a control target by executing various programs stored in the ROM 103.

Fan Drive Process for Cooling Radiator

The CPU 101 executes a fan drive process for driving the cooling fan 80. As described above, the cooling fan 80 is a fan for circulating the air around the radiator 71. Therefore, the CPU 101 executes the fan drive process to cool the radiator 71.

Figure 2:
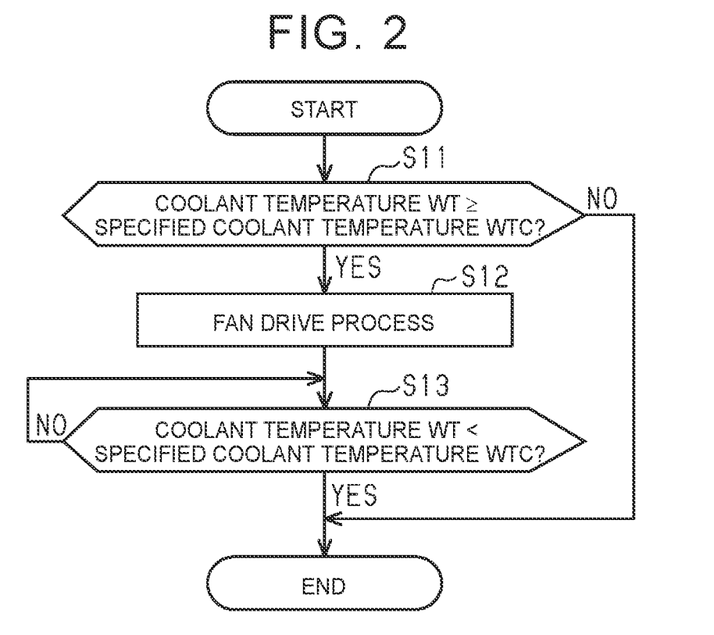
FIG. 2 is a flowchart showing a process related to a fan drive process.

The CPU 101 repeatedly executes a program for cooling the radiator 71 stored in the ROM 103 at a predetermined cycle. As a result, a series of processes shown in FIG. 2 is repeatedly executed. That is, the series of processes shown in FIG. 2 is realized by the CPU 101 repeatedly executing the program for cooling the radiator 71 stored in the ROM 103, for example, at a predetermined cycle.

Specifically, when the CPU 101 starts the program for cooling the radiator 71, the CPU 101 first executes the process of step S11. In step S11, the CPU 101 determines whether the coolant temperature WT that is the temperature of the coolant for cooling the internal combustion engine 20 is equal to or higher than a predetermined specified coolant temperature WTC. The specified coolant temperature WTC is set in advance by a test or a simulation as a temperature at which the coolant needs to be cooled in order to cool the internal combustion engine 20. The specified coolant temperature WTC is, for example, 95° C.

When it is determined that the coolant temperature WT is lower than the specified coolant temperature WTC (S11: NO), the CPU 101 ends the series of processes of this time. On the other hand, when it is determined that the coolant temperature WT is equal to or higher than the specified coolant temperature WTC (S11: YES), the CPU 101 advances the process to step S12.

In step S12, the CPU 101 executes the fan drive process for driving the cooling fan 80. Thereby, the air is circulated around the radiator 71, so that the coolant passing through the radiator 71 is cooled. Then, the CPU 101 advances the process to step S13.

In step S13, the CPU 101 determines whether the coolant temperature WT is lower than the specified coolant temperature WTC. When the coolant temperature WT is equal to or higher than the specified coolant temperature WTC (S13: NO), the CPU 101 repeats the process of step S13. That is, the fan drive process is continued until the coolant temperature WT becomes lower than the specified coolant temperature WTC.

On the other hand, when the coolant temperature WT is lower than the specified coolant temperature WTC (S13: YES), the CPU 101 ends the fan drive process. Then, the CPU 101 ends the series of processes of this time.

Figure 3:
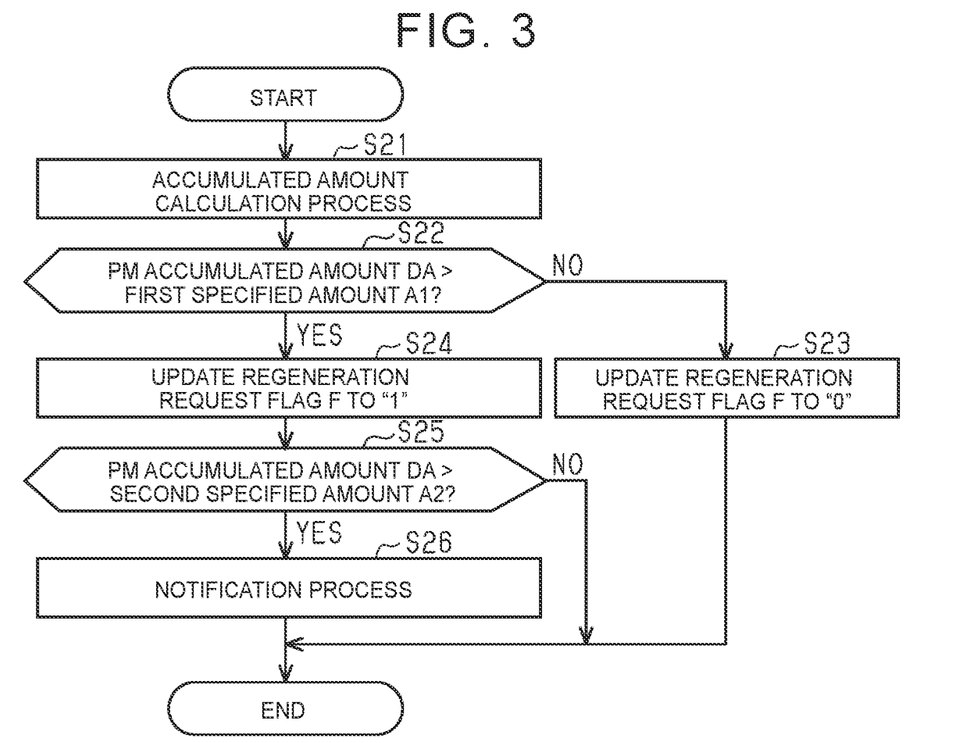
FIG. 3 is a flowchart showing a process for calculating an accumulated amount.

Accumulated Amount Calculation Process and Various Processes according to Particulate Matter Accumulated Amount The CPU 101 executes an accumulated amount calculation process for calculating a particulate matter (PM) accumulated amount DA that is an accumulated amount of particulate matter collected on the filter 53. Further, the CPU 101 executes an operation process for a regeneration request flag F and a notification process for a regeneration request based on the PM accumulated amount DA calculated by the accumulated amount calculation process. A series of these processes and a procedure for the processes will be described.

The CPU 101 repeatedly executes a program for determining the PM accumulated amount DA stored in the ROM 103 at a predetermined cycle. As a result, a series of processes shown in FIG. 3 is repeatedly executed. That is, the series of processes shown in FIG. 3 is realized by the CPU 101 repeatedly executing the program for determining the PM accumulated amount DA stored in the ROM 103, for example, at a predetermined cycle.

Specifically, when the CPU 101 starts the program for determining the PM accumulated amount DA, the CPU 101 first executes the process of step S21. In step S21, the CPU 101 executes the accumulated amount calculation process. In the accumulated amount calculation process, the CPU 101 repeatedly calculates a PM generation amount and a PM regeneration amount, and updates the PM accumulated amount DA to calculate the PM accumulated amount DA. Specifically, the CPU 101 calculates the sum obtained by adding a difference obtained by subtracting the PM regeneration amount from the PM generation amount to a value of the PM accumulated amount DA before being updated as a value of the latest PM accumulated amount DA, and updates the PM accumulated amount DA.

The PM generation amount is the amount of particulate matter generated by the combustion of the air-fuel mixture in the cylinder 24, and the CPU 101 calculates the PM generation amount from the operating state of the internal combustion engine 20, specifically, the intake air amount GA, the fuel injection amount, and the like.

The PM regeneration amount is the amount of particulate matter combusted in the filter 53. The higher the exhaust gas temperature TO, which is the temperature of the exhaust gas flowing into the filter 53, the higher the temperature of the filter 53. Therefore, the temperature of the filter 53 can be obtained from the temperature detected by the exhaust gas temperature sensor 94. The CPU 101 calculates a filter temperature FT that is the temperature of the filter 53 using a heat balance model of the filter 53 based on the flow rate of the exhaust gas flowing into the filter 53, the exhaust gas temperature TO, and the temperature of the outside air. The flow rate of the exhaust gas flowing into the filter 53 can be obtained from the intake air amount GA and the fuel injection amount. Further, for the temperature of the outside air, the intake air temperature TI detected by the air flow meter 92 can be used. When the exhaust gas containing oxygen flows into the filter 53 in a state where the filter temperature FT is equal to or higher than the ignition point of the particulate matter, the particulate matter accumulated on the filter 53 combusts. Since oxygen is required for the combustion of the particulate matter, the amount of the particulate matter combusted in the filter 53 at this time is determined according to the amount of oxygen in the exhaust gas flowing into the filter 53. The oxygen concentration of the exhaust gas flowing into the filter 53 can be obtained from the detection result of the air-fuel ratio sensor 93. Therefore, the CPU 101 calculates the PM regeneration amount based on the exhaust gas temperature TO detected by the exhaust gas temperature sensor 94, the oxygen concentration detected by the air-fuel ratio sensor 93, that is, the air-fuel ratio AF, the intake air amount GA, and the fuel injection amount. As described above, when the CPU 101 updates and calculates the PM accumulated amount DA, the CPU 101 advances the process to step S22.

Next, in step S22, it is determined whether the PM accumulated amount DA calculated by the accumulated amount calculation process is larger than a predetermined first specified amount A1. The first specified amount A1 is set in advance by a test or a simulation as, for example, the amount of accumulated particulate matter that can be eliminated by a spontaneous regeneration process described below.

When the CPU 101 determines in the process of step S22 that the PM accumulated amount DA is equal to or lower than the first specified amount A1 (S22: NO), the process proceeds to step S23. In step S23, the CPU 101 updates the regeneration request flag F to "0". Then, the CPU 101 ends the series of processes.

On the other hand, when the CPU 101 determines in the process of step S22 that the PM accumulated amount DA is larger than the first specified amount A1 (S22: YES), the process proceeds to step S24. In step S24, the CPU 101 updates the regeneration request flag F to "1". Then, the process proceeds to step S25. The regeneration request flag F is a flag in which execution of the filter regeneration process is required when the regeneration request flag F is updated to "1". Further, the regeneration request flag F is a flag in which execution of the filter regeneration process is not required when the regeneration request flag F is updated to "0". The regeneration request flag F is "0" in the initial state.

Next, in step S25, it is determined whether the PM accumulated amount DA calculated by the accumulated amount calculation process is larger than a predetermined second specified amount A2. The second specified amount A2 is set in advance as a value larger than the first specified amount A1. That is, the first specified amount A1 is set as a value smaller than the second specified amount A2 that is an upper limit amount. The second specified amount A2 is determined as follows. For example, when the PM accumulated amount DA exceeds a certain value, it is necessary to limit the output of the internal combustion engine 20 in order to protect the filter 53 and other parts. Therefore, the second specified amount A2 can be set as a value lower than the above certain value. That is, the second specified amount A2 is the upper limit amount of the PM accumulated amount DA that guarantees the normal driving of the internal combustion engine 20.

When the CPU 101 determines in the process of step S25 that the PM accumulated amount DA is equal to or lower than the second specified amount A2 (S25: NO), the CPU 101 ends the series of processes.
On the other hand, when the CPU 101 determines in the process of step S25 that the PM accumulated amount DA is larger than the second specified amount A2 (S25: YES), the process proceeds to step S26. In step S26, the CPU 101 executes the notification process for notifying that the regeneration process is necessary. In the notification process, the CPU 101 displays, for example, a signal indicating that maintenance at a repair shop is required on a multi-information display of the vehicle 10. Then, the CPU 101 ends the series of processes.

Regeneration Process

The CPU 101 executes the regeneration process for regenerating the filter 53 by combusting the particulate matter collected on the filter 53. The regeneration process includes a forced regeneration process executed under a condition that a request signal RS from an external tool 200 is received, and a spontaneous regeneration process spontaneously executed by the vehicle 10 without relying on the request signal RS from the external tool 200.

Further, the CPU 101 executes the fan drive process for driving the cooling fan 80 in order to cool the filter 53 depending on the situation along with the regeneration process. Hereinafter, the procedure of the spontaneous regeneration process and the fan drive process and the procedure of the forced regeneration process and the fan drive process will be described.

Spontaneous Regeneration Process and Fan Drive Process

Figure 4:
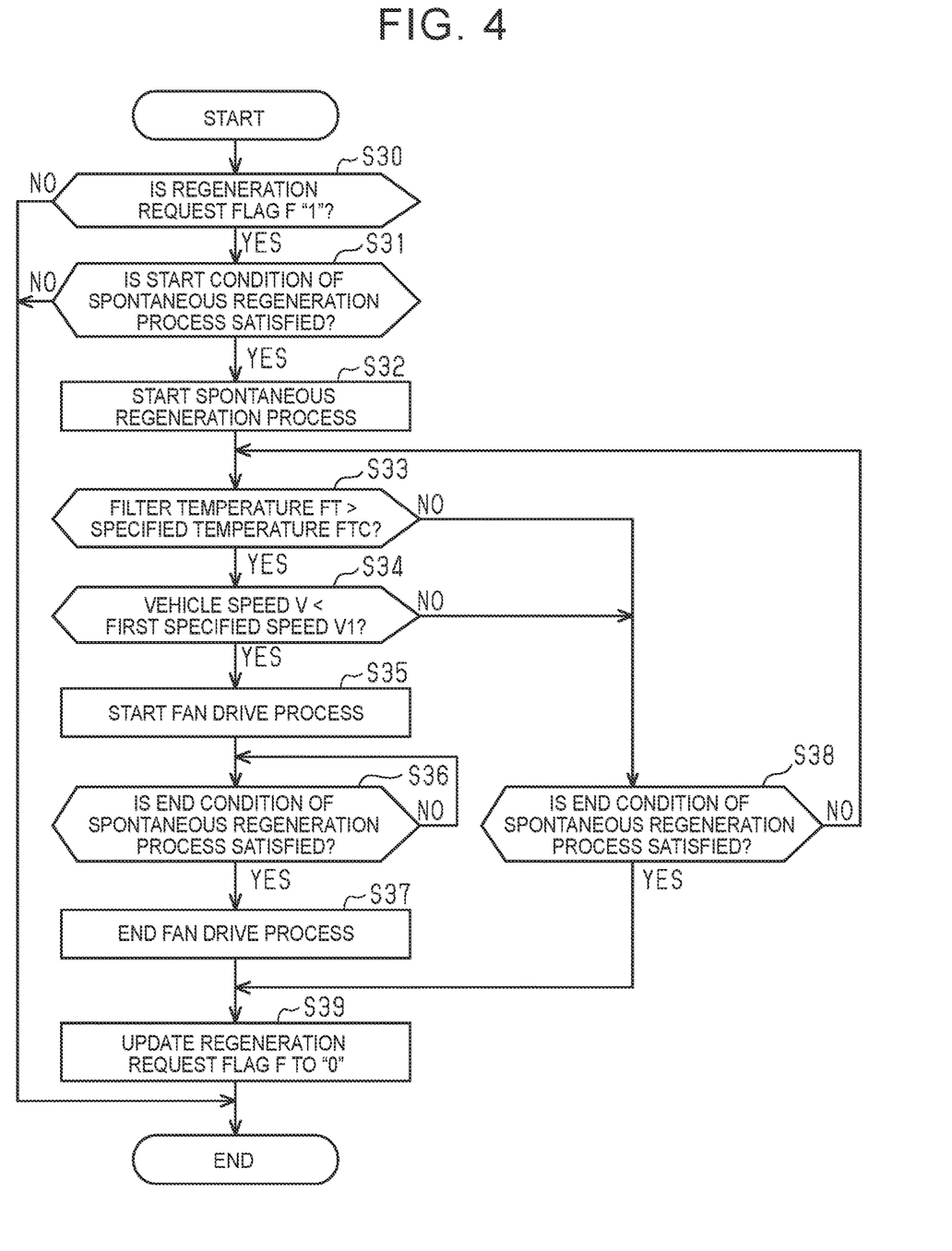
FIG. 4 is a flowchart showing a process related to a spontaneous regeneration process and the fan drive process.

The CPU 101 repeatedly executes a program related to the spontaneous regeneration process stored in the ROM 103 at a predetermined cycle. As a result, a series of processes shown in FIG. 4 is repeatedly executed. That is, the series of processes shown in FIG. 4 is realized by the CPU 101 repeatedly executing the program related to the spontaneous regeneration process stored in the ROM 103, for example, at a predetermined cycle.

Specifically, when the CPU 101 starts the program related to the spontaneous regeneration process, the CPU 101 first executes the process of step S30. In step S30, the CPU 101 determines whether the regeneration request flag F is "1".

When the regeneration request flag F is "0" (S30: NO), the CPU 101 ends the series of processes of this time. On the other hand, when the regeneration request flag F is "1" (S30: YES), the CPU 101 advances the process to step S31.

In step S31, the CPU 101 determines whether an execution condition of the spontaneous regeneration process is satisfied. The execution condition of the spontaneous regeneration process is, for example, that the accelerator operation amount is zero and the vehicle speed V exceeds a predetermined lower limit speed. An example of the lower limit speed is several km/h. When the execution condition of the spontaneous regeneration process is not satisfied (S31: NO), the CPU 101 ends the series of processes of this time. On the other hand, when the execution condition of the spontaneous regeneration process is satisfied (S31: YES), the CPU 101 advances the process to step S32.

In step S32, the CPU 101 starts the spontaneous regeneration process. Specifically, in order to combust the particulate matter collected on the filter 53, the CPU 101 executes temperature rise control for raising the temperature of the filter 53 to the temperature equal to or higher than the ignition point of the particulate matter.

In the temperature rise control, the CPU 101 first stops the spark ignition by the spark plug 45 to stop the combustion in the cylinder 24. Then, fuel is injected from the port injection valve 44. As a result, the air-fuel mixture containing the fuel is circulated to the exhaust passage 51 without being combusted in the cylinder 24. When the air-fuel mixture that has not been combusted is circulated through the exhaust passage 51, the air-fuel mixture is combusted in the three-way catalyst 52. In such fuel injection, the amount of fuel that can react with the three-way catalyst 52 is injected such that the injected fuel is not discharged to the downstream side by passing through the three-way catalyst 52.

As described above, the CPU 101 injects the fuel and generates heat in the three-way catalyst 52. Then, the CPU 101 transfers the heat generated in the three-way catalyst 52 to the downstream side using the exhaust gas circulating through the exhaust passage 51 as a medium. When the heat generated in the three-way catalyst 52 is transferred to the filter 53 as described above, and the temperature of the filter 53 becomes equal to or higher than the ignition point of the particulate matter, the particulate matter accumulated on the filter 53 can be combusted.

In a fuel introduction process during the temperature rise control, it is necessary to send the air-fuel mixture in the cylinder 24 to the exhaust passage 51 by pumping action caused by raising and lowering the piston 23 in a state where the combustion in the cylinder 24 is stopped. Therefore, the temperature rise control needs to be performed under a situation where rotation of the crank shaft 27 can be maintained by external power. While the vehicle 10 is coasting, the rotation of the crank shaft 27 can be maintained by power transmission from wheels even when the combustion in the cylinder 24 is stopped. Therefore, for example, the CPU 101 injects the fuel to execute the temperature rise control while the vehicle 10 is coasting as described above.

When the air is sent to the filter 53 by the pumping action caused by raising and lowering the piston 23 in a state where the temperature rise control is completed, the oxygen is supplied to the filter 53 and the PM is combusted. That is, the filter regeneration process executed by the CPU 101 includes the temperature rise control by the fuel introduction process and subsequent supply of the oxygen to the filter 53. Then, the CPU 101 starts the spontaneous regeneration process, and after a predetermined time has elapsed, the CPU 101 advances the process to step S33.

In step S33, the CPU 101 determines whether the filter temperature FT exceeds a predetermined specified temperature FTC. The specified temperature FTC is set in advance by a test or a simulation as a temperature equal to or higher than the ignition point of the particulate matter. When the filter temperature FT exceeds the predetermined specified temperature FTC (S33: YES), the CPU 101 advances the process to step S34.

In step S34, the CPU 101 determines whether the vehicle speed V is smaller than a predetermined first specified speed V1. When the vehicle speed V is smaller than the first specified speed V1 (S34: YES), the CPU 101 advances the process to step S35. The first specified speed V1 is set in advance by a test or a simulation as a speed at which the traveling wind can be obtained when the vehicle 10 travels to the extent that excessive heat is not applied to parts around the filter 53, in a case where the temperature of the filter 53 is raised by the spontaneous regeneration process. For example, the first specified speed V1 is set to 10 km/h.

In step S35, the CPU 101 executes the fan drive process for driving the cooling fan 80. At this time, the CPU 101 does not refer to the coolant temperature WT. That is, the fan drive process is a process that should normally be executed when the coolant temperature WT exceeds the specified coolant temperature WTC. On the other hand, in step S35, the CPU 101 exceptionally executes the fan drive process regardless of the coolant temperature WT under a condition that the filter temperature FT exceeds the specified temperature FTC and the vehicle speed V is smaller than the first specified speed V1. Then, when the cooling fan 80 is driven, the air blown from the cooling fan 80 reaches the filter 53. After starting the fan drive process, the CPU 101 advances the process to step S36.

In step S36, the CPU 101 determines whether an end condition of the spontaneous regeneration process is satisfied. The end condition of the spontaneous regeneration process is, for example, a case where the start condition of the spontaneous regeneration process is not satisfied, or a case where the PM regeneration amount in the current spontaneous regeneration process exceeds a certain amount. When the end condition of the spontaneous regeneration process is not satisfied (S36: NO), the CPU 101 repeats the process of step S36. That is, the CPU 101 continues the fan drive process until the spontaneous regeneration process ends.

On the other hand, when the end condition of the spontaneous regeneration process is satisfied (S36: YES), the CPU 101 advances the process to step S37 after ending the execution of the spontaneous regeneration process. In step S37, the CPU 101 ends the execution of the fan drive process. Then, the CPU 101 advances the process to step S39.

By the way, in step S33, when the filter temperature FT is equal to or lower than the specified temperature FTC (S33: NO), the CPU 101 advances the process to step S38. Further, in step S34, when the vehicle speed V is equal to or higher than the first specified speed V1 (S34: NO), the CPU 101 advances the process to step S38.

In step S38, the CPU 101 determines whether then end condition of the spontaneous regeneration process is satisfied. When the end condition of the spontaneous regeneration process is not satisfied (S38: NO), the CPU 101 returns the process to step S33. On the other hand, when the end condition of the spontaneous regeneration process is satisfied (S38: YES), the CPU 101 advances the process to step S39 after ending the execution of the spontaneous regeneration process.

In step S39, the CPU 101 updates the regeneration request flag F to "0". Then, the CPU 101 ends the series of processes. In the present embodiment, even if the notification process in step S26 described above is performed, the signal displayed on the multi-information display is not turned off depending on the execution of the spontaneous regeneration process.

Forced Regeneration Process and Fan Drive Process

The CPU 101 executes the forced regeneration process for forcibly regenerating the filter 53 by combusting the particulate matter collected on the filter 53. When the CPU 101 receives the request signal RS from the outside of the vehicle 10, the CPU 101 executes the forced regeneration process. For example, when the request signal RS is input to the control device 100 from the external tool 200 outside the vehicle 10 at the repair shop, the control device 100 receives the request signal RS. Further, the CPU 101 executes the fan drive process for driving the cooling fan 80 in order to cool the filter 53 along with the forced regeneration process. A series of these processes and a procedure for the processes will be described.

Figure 5:
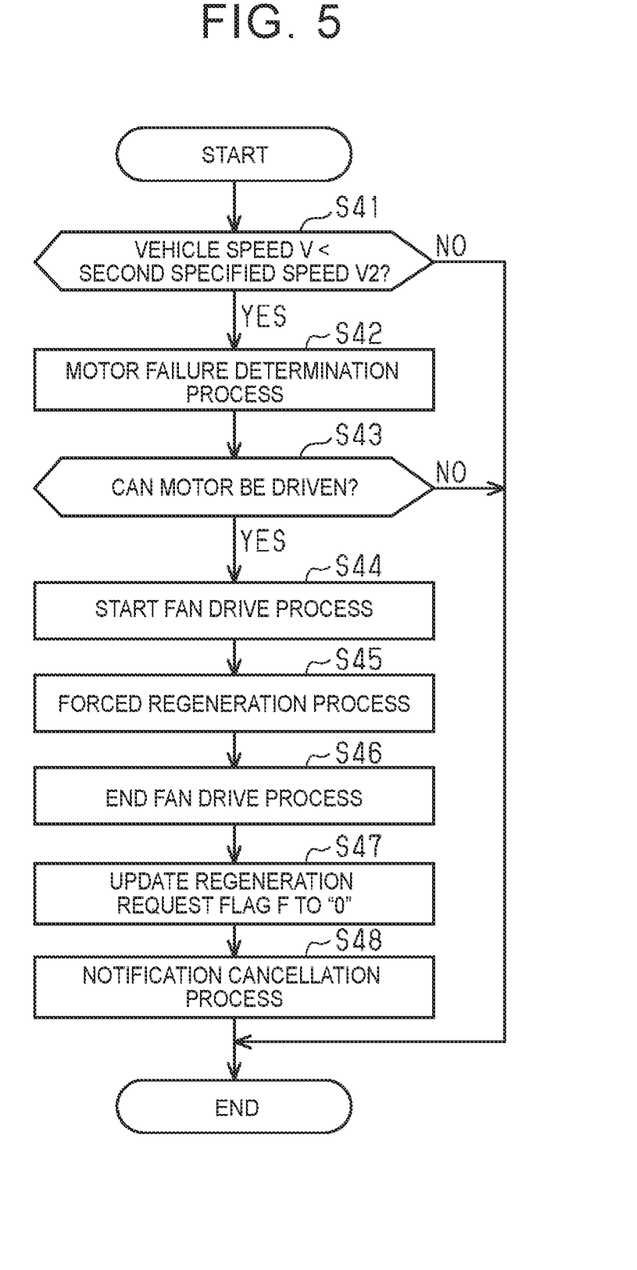
FIG. 5 is a flowchart showing a process related to a forced regeneration process and the fan drive process.

When the CPU 101 receives the request signal RS from the external tool 200, the CPU 101 executes a program related to the forced regeneration process stored in the ROM 103. As a result, a series of processes shown in FIG. 5 is executed. That is, the series of processes shown in FIG. 5 is realized by the CPU 101 executing the program related to the forced regeneration process stored in the ROM 103.

Specifically, when the CPU 101 starts the program related to the forced regeneration process, the CPU 101 first executes the process of step S41. In step S41, the CPU 101 determines whether the vehicle speed V is smaller than a predetermined second specified speed V2. The second specified speed V2 is set as a value smaller than the first specified speed V1, for example, 3 km/h. That is, in step S41, the CPU 101 determines whether the vehicle 10 is stopped or is in a state similar to a stopped vehicle. When the vehicle speed V is equal to or higher than the second specified speed V2 (S41: NO), the CPU 101 ends the series of processes of this time.

On the other hand, when the vehicle speed V is smaller than the second specified speed V2 (S41: YES), the CPU 101 advances the process to step S42. In step S42, the CPU 101 executes a motor failure determination process for determining presence or absence of a failure in the motor 82 of the cooling fan 80. Specifically, the CPU 101 determines whether the motor 82 is frozen, and when the motor 82 is frozen, the CPU 101 determines that the failure occurs. On the other hand, when the motor 82 is not frozen, the CPU 101 determines that the failure does not occur.

More specifically, when the motor failure determination process is started, the CPU 101 first detects the refrigerant pressure P of the refrigerant flowing between the condenser 61 and the evaporator 62 as a first refrigerant pressure. Next, the CPU 101 drives the motor 82 only for a predetermined time, for example, several tens of seconds. Then, the CPU 101 detects the refrigerant pressure P as a second refrigerant pressure. When the second refrigerant pressure is lower than the first refrigerant pressure, it is determined that the motor 82 is not frozen because the motor 82 is driven and the refrigerant is cooled. On the other hand, when the second refrigerant pressure is equal to or higher than the first refrigerant pressure, it is determined that the motor 82 is frozen because the motor 82 cannot be driven. Then, the CPU 101 advances the process to step S43.

In step S43, the CPU 101 determines whether the motor 82 can be driven based on a result of the motor failure determination process. When the result of the motor failure determination process is a determination result that the motor 82 is not frozen, the CPU 101 determines that the motor 82 can be driven. On the other hand, when the result of the motor failure determination process is a determination result that the motor 82 is frozen, the CPU 101 determines that the motor 82 cannot be driven. Then, when it is determined that the motor 82 can be driven (S43: YES), the CPU 101 advances the process to step S44.

In step S44, the CPU 101 executes the fan drive process for driving the cooling fan 80. That is, when the vehicle speed V is smaller than the second specified speed V2, the CPU 101 executes the fan drive process regardless of the coolant temperature WT, as in the case where the spontaneous regeneration process is executed. On the other hand, when the forced regeneration process is executed, the CPU 101 executes the fan drive process regardless of the filter temperature FT, unlike the case where the spontaneous regeneration process is executed. When the cooling fan 80 is driven, the air blown from the cooling fan 80 reaches the filter 53. After starting the fan drive process, the CPU 101 advances the process to step S45.

In step S45, the CPU 101 executes the forced regeneration process. The forced regeneration process includes, as in the spontaneous regeneration process, the temperature rise control and subsequent supply of the oxygen to the filter 53. However, in the forced regeneration process, the amount of fuel injected in the temperature rise control is larger than that in the spontaneous regeneration process. In the present embodiment, since the forced regeneration process is executed in a state where the vehicle 10 is not traveling, such as a state where the vehicle 10 is at the repair shop, the fuel injected in the temperature rise control may be discharged to the downstream side by passing through the three-way catalyst 52. Therefore, in the present embodiment, the amount of fuel injected per unit time in the temperature rise control in the forced regeneration process is larger than the amount of fuel injected per unit time in the temperature rise control in the spontaneous regeneration process. By the time when the forced regeneration process is started in step S45, the fan drive process has already been executed in step S44. In other words, after the fan drive process is started, the forced regeneration process is executed. Therefore, when the forced regeneration process is executed, the fan drive process is inevitably executed. Then, when the forced regeneration process is completed, the CPU 101 advances the process to step S46.

In step S46, the CPU 101 ends the execution of the fan drive process. Then, the CPU 101 advances the process to step S47. In step S47, the CPU 101 updates the regeneration request flag F to "0". Then, the CPU 101 advances the process to step S48. In step S48, the CPU 101 executes a notification cancellation process for canceling the notification process. Specifically, the signal displayed on the multi-information display of the vehicle 10 in the notification process is turned off. Then, the CPU 101 ends the series of processes.

By the way, when it is determined that the motor 82 cannot be driven (S43: NO), the CPU 101 ends the series of processes of this time. That is, in this case, the CPU 101 prohibits the fan drive process and the forced regeneration process in the series of processes of this time.

Action of Present Embodiment

In the above embodiment, even in a case where the PM accumulated amount DA becomes larger than the first specified amount A1 when the internal combustion engine 20 of the vehicle 10 is driven, the CPU 101 performs the spontaneous regeneration process to regenerate the filter 53. As a result, the PM accumulated amount DA of the filter 53 is reduced.

After the PM accumulated amount DA becomes larger than the first specified amount A1, the PM accumulated amount DA continues to increase if a condition for executing the spontaneous regeneration process is not satisfied. Then, when the PM accumulated amount DA becomes larger than the second specified amount A2, the notification process executed by the CPU 101 notifies the user of necessity of maintenance at the repair shop.

Then, when the vehicle 10 receives the request signal RS from the external tool 200 at the repair shop or the like, the CPU 101 executes the forced regeneration process. As a result, the PM accumulated amount DA can be reduced.

Here, in the forced regeneration process performed at the repair shop or the like, the temperature of the filter 53 tends to be higher than that in the spontaneous regeneration process performed while the vehicle 10 is traveling. This is because the PM accumulated amount DA in the forced regeneration process is larger than the PM accumulated amount DA in the spontaneous regeneration process, so that the calorific value when the oxygen is supplied to the filter 53 after the temperature rise control is large. Further, when the vehicle 10 is not traveling at the repair shop or the like, there is a high possibility that the coolant temperature WT is equal to or lower than the specified coolant temperature WTC. Further, when the vehicle 10 is not traveling at the repair shop or the like, it is desirable to raise the temperature of the filter 53 as quickly as possible within a range not exceeding the upper limit from the viewpoint of work efficiency.

Therefore, in the forced regeneration process, in a state where the coolant temperature WT is equal to or lower than the specified coolant temperature WTC, the temperature of the filter 53 tends to be higher than that in the spontaneous regeneration process. If, in the forced regeneration process, the fan drive process is performed after the filter temperature FT exceeds the specified temperature FTC as in the spontaneous regeneration process, the heat from the filter 53 may excessively stay around the filter 53. As a result, the heat generated from the filter 53 may adversely affect the parts around the filter 53.

Effect of Present Embodiment (1) In the above embodiment, when the vehicle speed V is smaller than the first specified speed V1, the traveling wind generated when the vehicle 10 travels cannot be sufficiently obtained. Therefore, the air cannot be circulated around the filter 53 by the traveling wind. Further, in a case where the regeneration process is not executed, the CPU 101 basically does not execute the fan drive process when the coolant temperature WT is equal to or lower than the specified coolant temperature WTC. Therefore, if the CPU 101 executes the fan drive process based only on the coolant temperature WT, even when the regeneration process is executed, the fan drive process is not executed when the coolant temperature WT is equal to or lower than the specified coolant temperature WTC.

According to the above embodiment, in the forced regeneration process of the regeneration processes, when the vehicle speed V is smaller than the second specified speed V2, the coolant temperature WT is equal to or lower than the specified coolant temperature WTC. Therefore, even when it is not necessary to cool the coolant, the CPU 101 executes the fan drive process. As a result, it is possible to suppress a situation in which the fan drive process is not executed because the coolant temperature WT is equal to or lower than the specified coolant temperature WTC. Therefore, even when the traveling wind is not obtained, the air around the filter 53 is circulated by the fan drive process, so that overheating of the filter 53 can be suppressed.

(2) According to the above embodiment, when the request signal RS from the outside of the vehicle 10 is received and the forced regeneration process is executed, the fan drive process is executed regardless of the filter temperature FT. Therefore, the fan drive process can be executed before the filter temperature FT exceeds the specified temperature FTC. As described above, cooling of the filter 53 is started in a state where the filter temperature FT is not excessively high, so that it is possible to suppress the filter temperature FT from becoming higher than the specified temperature FTC. As a result, it is possible to suppress the heat from excessively staying around the filter 53. Further, even if the filter temperature FT becomes equal to or higher than the specified temperature FTC, it is possible to suppress the filter temperature FT from significantly exceeding the specified temperature FTC, so that it is possible to quickly suppress the heat from excessively staying around the filter 53.

(3) According to the above embodiment, when the spontaneous regeneration process is executed without relying on the request signal RS from the outside of the vehicle 10, the CPU 101 executes the fan drive process under a condition that the filter temperature FT exceeds the specified temperature FTC. The PM accumulated amount DA when the spontaneous regeneration process is executed is likely to be smaller than the PM accumulated amount DA when the forced regeneration process is executed. Reflecting this difference in the PM accumulated amounts DA, the calorific value in the filter 53 when the spontaneous regeneration process is executed is smaller than that when the forced regeneration process is executed. As long as the spontaneous regeneration process in which the calorific value in the filter 53 is small as described above, the periphery of the filter 53 is quickly cooled even when the cooling fan 80 is driven only when the filter temperature FT exceeds the specified temperature FTC. Then, driving of the cooling fan 80 is limited, so that energy consumption associated with driving of the cooling fan 80 can be also suppressed.

(4) According to the above embodiment, the CPU 101 executes the motor failure determination process when the forced regeneration process is executed. When it is determined in the motor failure determination process that the failure occurs in the motor 82, the CPU 101 prohibits the fan drive process and the forced regeneration process. Therefore, even if the request signal RS is input from the outside of the vehicle 10, and the forced regeneration process is executed, the CPU 101 does not execute the fan drive process when it is determined that the failure occurs in the motor 82. Therefore, in such a case, it is possible to suppress an excessive load from being applied to the motor 82 of the cooling fan 80. Further, the forced regeneration process is prohibited as well as the fan drive process, so that it is possible to suppress excessive heat from being applied to the periphery of the filter 53.

(5) According to the above embodiment, when the forced regeneration process is executed, the CPU 101 executes the forced regeneration process after executing the fan drive process. That is, the fan drive process is executed before the forced regeneration process is executed. Therefore, the cooling fan 80 is driven before the temperature of the filter 53 rises, so that the air can be blown to the periphery of the filter 53. Therefore, even when the filter temperature FT rises, the air is blown to the periphery of the filter 53, so that the heat of the filter 53 is likely to be sequentially removed from the periphery of the filter 53. Therefore, it is possible to suppress the heat from staying around the filter 53.

OTHER EMBODIMENTS

The above embodiment can be modified and implemented as follows. The above embodiment and modification examples described below may be carried out in combination of each other within a technically consistent range.

The cooling fan 80 may be any fan that can circulate the air around the radiator 71 and around the filter 53. For example, the cooling fan 80 may not be a fan for circulating the air around the condenser 61 of the cooling device 60.

The intensity of the fan drive process may not be constantly the same, for example, when the output of the motor 82 can be controlled. For example, the output of the motor 82 may be larger in a case of the fan drive process associated with the forced regeneration process than in a case of the fan drive process associated with the spontaneous regeneration process. More specifically, in the case of the fan drive process associated with the forced regeneration process, it is preferable that the output of the motor 82 be maximum.

As described above, in the case of the forced regeneration process, the heat is more likely to be generated than in the case of the spontaneous regeneration process. Therefore, when the output of the motor 82 is large, more air around the filter 53 can be agitated, so that the heat is less likely to stay around the filter 53.

The control device 100 is not limited to a device that includes the CPU 101 and the ROM 103, and executes software processing. For example, the control device may include a dedicated hardware circuit (for example, an application-specific integrated circuit (ASIC)) that performs hardware processing on at least a part of what has been subjected to software-processing in the above embodiment. That is, the control device 100 only needs to include any of the following configurations (a) to (c). (a) A processing device that executes all of the above processes according to a program and a program storage device such as a ROM for storing the program. (b) A processing device that executes a part of the above processes according to a program, a program storage device, and a dedicated hardware circuit for executing the remaining processes. (c) A dedicated hardware circuit that executes all of the above processes. Here, multiple software execution devices provided with the processing device and the program storage device, and multiple dedicated hardware circuits may be provided.

The accumulated amount calculation process is not limited to the example of the above embodiment, and it is sufficient as long as the PM accumulated amount DA can be calculated. For example, the PM accumulated amount DA may be calculated based on the pressure difference between the front part and the rear part of the filter 53.

In the forced regeneration process and the spontaneous regeneration process, in the temperature rise control, the control for performing fuel injection in a state where the combustion in the cylinder 24 is stopped is shown as an example, but the present disclosure is not limited to this. For example, dither control for each cylinder 24, fuel cut control for some cylinders 24, and control in which the ignition timing is on the retard side may be used. The dither control is control in which the air-fuel ratio in some cylinders 24 is richer than the stoichiometric air-fuel ratio, and the air-fuel ratio in other cylinders 24 is leaner than the stoichiometric air-fuel ratio. The fuel cut control for some cylinders 24 is control for continuing fuel supply to other cylinders 24 while supply of the fuel to some cylinders 24 is stopped. In particular, when the temperature rise control in the forced regeneration process is performed in a state where the vehicle 10 is stopped, the dither control or the fuel cut control for some cylinders 24 is preferable in order to maintain the rotation of the crank shaft 27.

In the above embodiment, the amount of fuel injected per unit time in the temperature rise control in the forced regeneration process is larger than the amount of fuel injected per unit time by the temperature rise control in the spontaneous regeneration process, but the difference between the forced regeneration process and the spontaneous regeneration process is not limited to this point. For example, in addition to or instead of this point, the time of the temperature rise control in the forced regeneration process may be longer than the time of the temperature rise control in the spontaneous regeneration process. The temperature rise control in the forced regeneration process may be performed easily as compared with the temperature rise control in the spontaneous regeneration process.

When executing the forced regeneration process, the CPU 101 may execute the forced regeneration process at the same time as starting the fan drive process, or may execute the forced regeneration process before starting the fan drive process.

When executing the forced regeneration process, the CPU 101 may execute the fan drive process under a condition that the filter temperature FT exceeds the specified temperature FTC. In this case, as in the modification described above, the CPU 101 may execute the fan drive process under a condition that the filter temperature FT exceeds the specified temperature FTC after the forced regeneration process is executed.

The second specified speed V2 may be the same as the first specified speed V1. When the second specified speed V2 is set in the same manner as the first specified speed V1, the CPU 101 may execute the forced regeneration process under a condition that the vehicle speed V is smaller than the second specified speed V2.

The motor failure determination process is not limited to the example of the above embodiment. In the above embodiment, the presence or absence of the failure of the motor 82 is determined using the refrigerant pressure P, but for example, the presence or absence of the failure of the motor 82 may be determined based on electric current flowing through the motor 82.

In the above embodiment, the CPU 101 may not execute the program related to the spontaneous regeneration process. That is, the CPU 101 may execute the forced regeneration process without executing the spontaneous regeneration process.

In the above embodiment, the CPU 101 may not execute the program related to the forced regeneration process. In this case, the regeneration process includes the spontaneous regeneration process, and the CPU 101 may execute the spontaneous regeneration process.

In the above embodiment, the CPU 101 may omit the process of step S33 when executing the program related to the spontaneous regeneration process. That is, when executing the spontaneous regeneration process, the CPU 101 may execute the fan drive process regardless of the filter temperature FT.

The notification process is not limited to the example of the above embodiment. For example, a message may be notified to a smartphone associated with the vehicle 10.

In the above embodiment, the request signal RS from the outside of the vehicle 10 is not limited to a signal transmitted from the external tool 200 at the repair shop. For example, the control device 100 includes a receiving device capable of wireless communication, and the control device 100 may receive a signal from a server or the like by wireless communication.

What is claimed is:

1. A vehicle control device that controls a vehicle comprising: an internal combustion engine including an exhaust passage through which exhaust gas circulates and a filter for collecting particulate matter contained in the exhaust gas; a radiator for cooling coolant of the internal combustion engine; and a cooling fan for circulating air around the radiator and around the filter, the vehicle control device comprising:
a memory; and
a processor configured to execute
an accumulated amount calculation process for calculating a particulate matter accumulated amount that is an accumulated amount of the particulate matter collected on the filter,
a regeneration process that is executed under a condition that the particulate matter accumulated amount exceeds a predetermined specified amount and that regenerates the filter when the particulate matter collected on the filter is combusted, and
a fan drive process for driving the cooling fan when a coolant temperature that is a temperature of the coolant is higher than a predetermined specified coolant temperature, wherein:
when the regeneration process is executed, the processor is configured to execute the fan drive process regardless of the coolant temperature under a condition that a vehicle speed that is a speed of the vehicle is at least smaller than a predetermined specified speed,
the regeneration process includes a forced regeneration process executed under a condition that the particulate matter accumulated amount exceeds a predetermined upper limit amount as a value larger than the specified amount, the vehicle speed is smaller than the specified speed, and a request signal from an outside of the vehicle is received; and
when the forced regeneration process is executed, the processor is configured to execute the fan drive process regardless of the coolant temperature and a temperature of the filter.

2. The vehicle control device according to claim 1, wherein:
the regeneration process further includes a spontaneous regeneration process that is spontaneously executed by the processor without relying on the request signal from the outside of the vehicle; and
when the spontaneous regeneration process is executed, the processor is configured to execute the fan drive process regardless of the coolant temperature under a condition that the vehicle speed is smaller than the specified speed and the temperature of the filter exceeds a predetermined specified temperature.

3. A vehicle control device that controls a vehicle comprising: an internal combustion engine including an exhaust passage through which exhaust gas circulates and a filter for collecting particulate matter contained in the exhaust gas; a radiator for cooling coolant of the internal combustion engine; and a cooling fan for circulating air around the radiator and around the filter, the vehicle control device comprising:
a memory; and
a processor configured to execute an accumulated amount calculation process for calculating a particulate matter accumulated amount that is an accumulated amount of the particulate matter collected on the filter, a regeneration process that is executed under a condition that the particulate matter accumulated amount exceeds a predetermined specified amount and that regenerates the filter when the particulate matter collected on the filter is combusted, and a fan drive process for driving the cooling fan when a coolant temperature that is a temperature of the coolant is higher than a predetermined specified coolant temperature, wherein:

when the regeneration process is executed, the processor is configured to execute the fan drive process regardless of the coolant temperature under a condition that a vehicle speed that is a speed of the vehicle is at least smaller than a predetermined specified speed;

the regeneration process includes a forced regeneration process executed under a condition that the particulate matter accumulated amount exceeds a predetermined upper limit amount as a value larger than the specified amount, the vehicle speed is smaller than the specified speed, and a request signal from an outside of the vehicle is received;

the cooling fan includes a fan main body and a motor for driving the fan main body;

the processor is configured to execute an internal combustion engine failure determination process for determining presence or absence of a failure in the internal combustion engine; and when the determination is made in the internal combustion engine failure determination process that the failure occurs in the motor, the processor is prohibited from executing the fan drive process and the forced regeneration process.

4. A vehicle control device that controls a vehicle comprising: an internal combustion engine including an exhaust passage through which exhaust gas circulates and a filter for collecting particulate matter contained in the exhaust gas; a radiator for cooling coolant of the internal combustion engine; and a cooling fan for circulating air around the radiator and around the filter, the vehicle control device comprising:

a memory; and a processor configured to execute an accumulated amount calculation process for calculating a particulate matter accumulated amount that is an accumulated amount of the particulate matter collected on the filter, a regeneration process that is executed under a condition that the particulate matter accumulated amount exceeds a predetermined specified amount and that regenerates the filter when the particulate matter collected on the filter is combusted, and a fan drive process for driving the cooling fan when a coolant temperature that is a temperature of the coolant is higher than a predetermined specified coolant temperature, wherein when the regeneration process is executed, the processor is configured to execute the fan drive process regardless of the coolant temperature under a condition that a vehicle speed that is a speed of the vehicle is at least smaller than a predetermined specified speed, wherein the regeneration process includes a forced regeneration process executed under a condition that the particulate matter accumulated amount exceeds a predetermined upper limit amount as a value larger than the specified amount, the vehicle speed is smaller than the specified speed, and a request signal from an outside of the vehicle is received, and wherein the processor is configured to execute the forced regeneration process after the fan drive process is started.

* * * * *